United States Patent [19]

Welin

[11] 4,002,890
[45] Jan. 11, 1977

[54] METHOD OF CHARGING FUEL COSTS AMONG THE VARIOUS APARTMENTS IN AN APARTMENT HOUSE OR THE LIKE AND SUITABLE DEVICES IN THIS CONNECTION

[75] Inventor: Karl Filip Einar Welin, Lidingo, Sweden

[73] Assignee: Einar Welins Patenter Kommanditbolag, Lidingo, Sweden

[22] Filed: July 30, 1975

[21] Appl. No.: 600,231

[30] Foreign Application Priority Data

Aug. 1, 1974 Sweden .............................. 7407284

[52] U.S. Cl. .............................. 235/151.3; 235/183
[51] Int. Cl.² ......................................... G06G 7/56
[58] Field of Search ............ 235/151.3, 151.2, 183; 73/340

[56] References Cited

UNITED STATES PATENTS 3,766,782  10/1973  Shimomura ................. 235/151.3 X
3,808,411  4/1974   Hoffmann ....................... 235/151.3

*Primary Examiner*—Edward J. Wise
*Attorney, Agent, or Firm*—Sughrue, Rothwell, Mion, Zinn & Macpeak

[57] ABSTRACT

Allocation of heating costs in an apartment building having a central heating plant common to a number of apartments in dependency of the heat comfort really enjoyed by the consumers concerned by basing said allocation upon a representative instantaneous average air temperature in the apartment in question, said temperature being determined by electric measurement with means highly sensitive to temperature changes and placed at one or more suitable points in the apartment concerned, said temperature value being also simultaneously rated with respect to the room surface represented, the obtained average temperature being thereafter integrated by passing the measured value via a converter to an electric integrating device, the output value of which determines in conjunction with the apartment surface the part each individual consumer has in the total heating costs for the apartment building.

18 Claims, 1 Drawing Figure

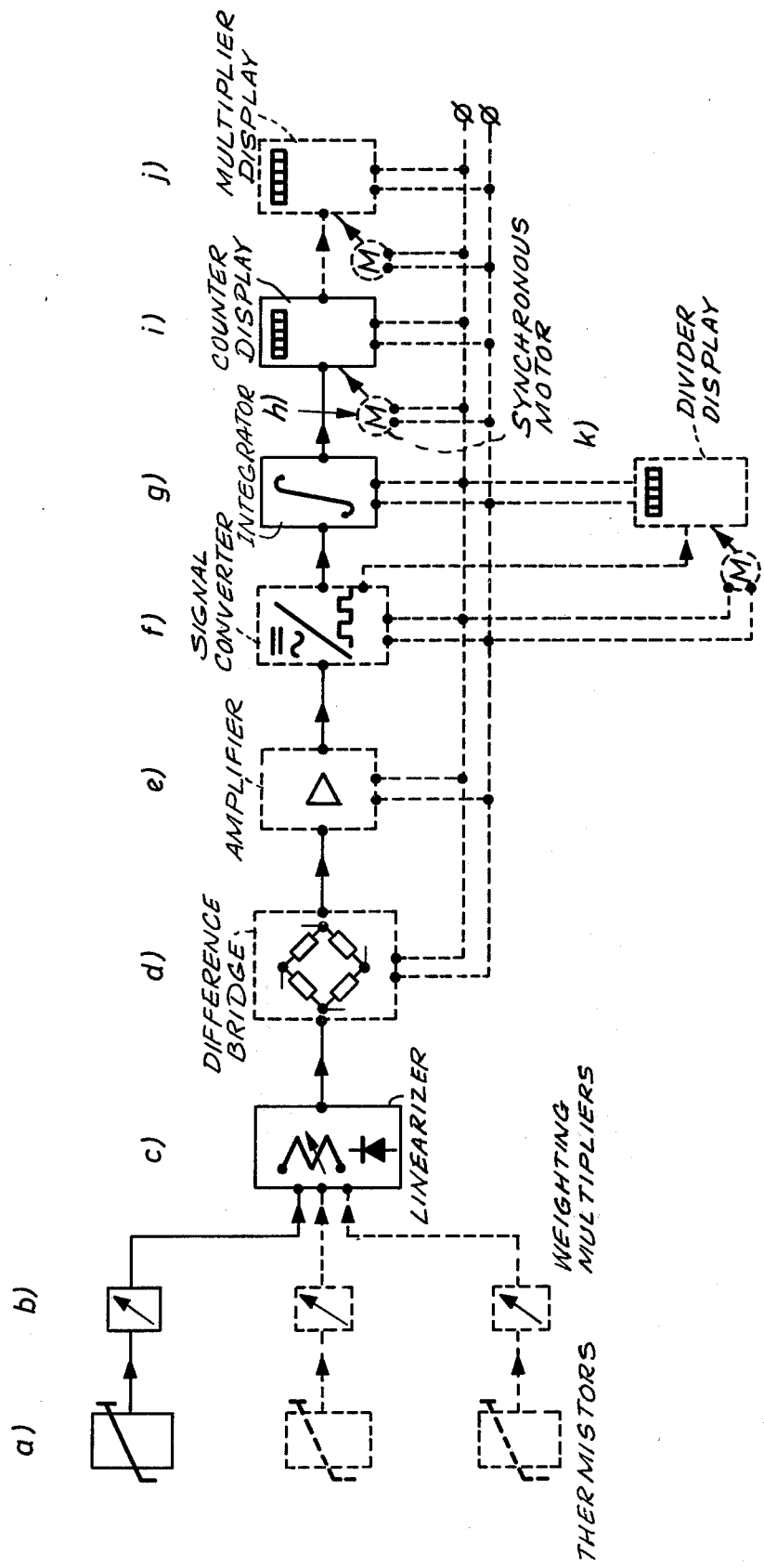

METHOD OF CHARGING FUEL COSTS AMONG THE VARIOUS APARTMENTS IN AN APARTMENT HOUSE OR THE LIKE AND SUITABLE DEVICES IN THIS CONNECTION

BACKGROUND OF THE INVENTION

It has always been a great problem to know how best to allocate the fuel costs among the various apartments in an apartment house. The situation has become further accentuated through the fuel shortage which occurred at the end of 1973, with the accompanying rationing, and through the heavy rise of prices which has had a significant effect on the total housing costs.

The following requirements may be placed on an acceptable system of allocation:

a. justice within the limits of what is practicable,
b. incitement to saving,
c. each tenant should be able to read off and understand how he can influence the quantities which determine the amount charged to him,
d. the possibility of applying the system to the individual households in the event of rationing, and
e. low acquisition, installation and operational costs for the necessary apparatus.

Whatever system one adopts, a completely just arrangement cannot be achieved. It has hitherto not been possible simultaneously to take into account such factors as:

a. the dependence on neighbours' heating habits, and the possibility of wrongfully drawing benefit therefrom,
b. the location of the apartment in the building, e.g. whether a chimney runs through one of the walls or whether the apartment has a southward aspect but entails the same rent per unit area as all others despite the greater amount of sunshine and therefore smaller heat requirement from radiators or the like, and
c. heating, water and sanitation coupling to the neighbours, in that the same pipes supply several apartments or the like.

In Sweden the method chiefly employed is to allocate the total fuel costs of the building according to the area of the individual apartments; in special types of building account is sometimes taken of ceiling heights etc., so that a certain volume dependence enters into the picture. Other fuel clauses speak of "fireplaces", which, in general, may be taken to be the number of rooms. For large rooms, however, the number of fireplaces is increased, so that in this case as well one may speak in a way of a charge by area.

On the continent the system of heat volume metering according to the evaporation principle is often employed, and specialist firms apply and seal the meters to each individual radiator, thereafter reading the result and charging accordingly at the end of the heating season.

None of the above-described systems satisfies the initially named requirements. The Swedish method is, of course, practically cost-free and the continental method incites to saving, but as regards the other requirements both systems leave much to be desired.

SUMMARY OF THE INVENTION

The object of the present invention is, to a greater extent than hitherto, to satisfy the initially named requirements in a manner and by means of devices which will be described below.

A "genuine" heat volume measurement implies the formation of $$k \cdot \int_{t_1}^{t_2} (T_1 - T_2) Q \, dt$$

where $k$ is a constant, $t_2$ and $t_1$ signify the times for the end and beginning, respectively, of the integration period, $T_1$ and $T_2$ the input and output temperatures, respectively, and $Q$ the volume of the heat-carrying medium per time unit. If each individual apartment is to have its own metering equipment, this involves from the point of view of apparatus, and thus of cost, an impractical solution, at all events if one wishes to avoid the disadvantages of evaporation meters. Even if in certain circumstances — and in certain countries — one wished to retain the "heat volume principle" or modifications of it, a variant of the invention described below should be of interest and competitive in relation to the evaporation meters.

The basic idea underlying the invention is, by means of relatively cheap electrical, automatically operating apparatus, continuously to measure the temperature at one or more positions in an apartment, and that the measured temperature value (mean apartment temperature), after some processing, is passed to an integration device which — after a certain integration time, the heating season — delivers a result which is considered to constitute one of the factors which shall determine the apartment's proportion of the total fuel costs for the building.

As the apparatus would usually require an electric mains supply, it can easily be arranged so that the integration time automatically coincides with the heating season by switching the supply on and off at the same time as the electrical equipment for the central heating plant.

In the main variant of the invention (which makes no claim to be based on an exact physical theory) the formation of a mean temperature with acceptable accuracy for the entire apartment is striven for, which usually should be attainable by using a single temperature-sensing element at a characteristic place in the apartment (compare the single thermostat in perhaps 90 % of all oil-fired houses), while in other cases several such elements, placed in different rooms, may be necessary, in which case the values from these different elements are "weighted" according to the dimensions etc. of the rooms before being combined into a common measured temperature value. The latter value is then taken — usually via auxiliary apparatus described below — to an integration device furnished with a presentation equipment, often in the form of a mechanical counter with number drums or the like. The mean temperature — or the difference from a given base temperature — shown by the presentation equipment will then, together with the dimensions of the apartment, determine the allocation of the total fuel costs of the building.

One way of allocating the charges according to the invention is, in ordinary apartment houses with equal or nearly equal ceiling height in the various apartments, to proceed from the area of the apartment as a "basic figure". A "base temperature" of, for example, 18° C may also be established, each degree of excess temperature being penalized by increasing the "basic figure" by, for example, 8 % (or correspondingly rewarding each degree of lower temperature). The "allocation figures" arrived at in this way are then used directly as basis for the allocation of fuel costs.

An example of such allocation in a small building with, say, 10,000 crowns in total fuel cost may be as follows:

| Tenent | Area m² ("basic figure") | Measured mean temp. | Factor (8 % /° C base 18°) | "Alloc. fig." (basic fig. × factor) | Charge crowns $\left(\frac{92}{1236} \cdot 10{,}000 = 744 \text{ etc.}\right)$ |
|---|---|---|---|---|---|
| A | 100 | 17° | 0,92 | 92 | 744 |
| B | 100 | 19° | 1,08 | 108 | 871 |
| C | 200 | 22° | 1,32 | 264 | 2140 |
| D | 200 | 26° | 1,64 | 328 | 2656 |
| E | 300 | 24° | 1,48 | 444 | 3589 |
|   | 900 m² |   |   | 1236 | 10,000 crowns |

The consequence of this is, of course, that each tenant pays a "fixed" charge — depending on the dimensions of the apartment — for his connection to the heating system and for heating of common space etc., but that he also has a highly appreciable stimulus to save energy by keeping down his mean temperature in the apartment.

The variant of the invention described is chiefly intended for the most commonly occurring heating system, namely by means of water-borne heat. Other modifications of the basic principle — integration of actual measured temperatures — are naturally conceivable also for air-borne heat and even for electric heat. In the latter case it will preferentially be a question of a complement to the present form of charging solely by kWh, which in all its simplicity does not fulfil all the initially named requirements on a charging system (e.g. the possibility of "getting a lift" from one's neighbours).

BRIEF DESCRIPTION OF THE DRAWING

A circuit diagram for the invention is shown in the sole FIGURE of the drawing.

DESCRIPTION OF THE PREFERRED EMBODIMENTS

Referring now to the drawing, the circuitry according to the invention is represented by the following notations:

a. One or more highly sensitive temperature-sensing elements in the apartment, preferentially thermistors, for example, Phillips 9004 NTC-thermistors. It is, of course, possible to use also other temperature-sensing elements (thermocouples, resistor elements etc), but as it is necessary to use an inexpensive device, thermistors would seem to be preferable, at least today.

b. Devices, if required, for introduction of coefficients by multiplication. In the main variant, and in the event that several temperature-sensing elements must be used in each apartment, it may be advantageous, as already noted, to weight these values in relation to one another, and this can be done for example by connecting small potentiometers to each element in the known manner.

c. A device, if required, for linearization of measured values. Thermistors, in particular, have a pronounced non-linear characteristic. As the temperature range here amounts only to, say 16°–26° C and the accuracy can in some cases be limited to approximately ± 3 %, some types may possibly be used directly, while the measured values from others must be linearized. In the simplest case this can be done in the known manner by connection of a fixed resistance in parallel, while in other cases, also in the known manner, zener diodes or other passive, non-linear electronic components may suitably be adopted.

d. A bridge connection, if required, for formation of the difference between the measured temperature and a "base temperature" given by the electric data, of which one at least should appropriately be adjustable, for the other branches of the bridge. At the same time the measured temperature in this case, which hitherto may have had the character of a resistance value, can be converted to a voltage (or current). Both elements (c) and (d) are well known in the measurement art as represented, for example, by Doebelin, *Measurement Systems, Applications and Design*, McGraw-Hill (1966), page 534, chapter 8.

e. An amplifier, if required, preferably in the form of a transistorized operational amplifier such as, for example, that described at page 3–99, *The Linear Integrated Circuits Catalogue*, Fairchild Corp., Feb. 1973.

f. A signal converter, if required, in the event that the ingoing measured temperature signal does not coincide with the type of signal required by the integration device under (g) below, for example a sine-wave cutting device if the integration device consists of a single phase meter, or a temperature-frequency converter with with subsequent frequency division if the integration is to be effected by means of a stepdriven counter, in both cases provided that the input value is direct current. A suitable signal converter may be, for example, a voltage controlled oscillator as described at page 4–18, *The Linear Integrated Circuits Catalogue*, Fairchild Corp., Feb. 1973.

g. An integration device, preferentially in the form of a single-phase electricity meter, a stepping relay or an electrolytic apparatus (with sensing device for reverse direction of current. Element (h) may be, for example, a subtraction meter type ZS4B 14W1-1/6 manufactured by AEG-Telefunken, Germany.

h. A synchronous motor, if required, operating on the excess-energy meter principle, which, via a differential, acts upon the presentation device under (i) below so that its deflection becomes a measure of the integral of the excess temperature above a given basic temperature, i. A presentation device with or without back stop, preferentially in the form of a mechanical counter or an electronic numerical display. The elements (g) and (i) can together be represented by an impulse counter of ordinary type, where element (g) is a stepping relay and element (i) is a numerical display.

j. An alternative presentation device, based on known analog or digital technique, in the form of a multiplier of the amount by which the mean temperature deviates from a base temperature according to (d) or (h) by the factors tabulated above, whereby the percentual amount of penalty or reward can be continuously read off. Both elements (i) and (j) can be implemented by semiconductor circuits as, for example, Texas Instruments SN 745274 and/or SN 745381.

k. An alternative device to (h) and (i) - possibly also (g) — in the form of a continuous division device between the integrated measured temperature during the part of the heating season elapsed hitherto and a consecutive time value starting from the same point of time. The device will thus continuously show the mean temperature during the elapsed portion of the heating season and can be executed in the known manner either in analog or digital technique.

The drawing should be taken as an example of how, via miscellaneous auxiliary apparatus, a temperature value is passed to an integration device. Depending on the data, linearity etc. of the components, one or more units of this auxiliary apparatus can be eliminated and, in particular, the sequence between, for example, the linearization device, bridge connection and amplifier can be reversed. The system can also be driven either with direct or alternating current, depending on the choice of components. If, for example, stepping relays and electronic numerical displays are used, pulsed signals are of course adopted.

The principle of the invention to integrate one or more temperature values of interest is, as already noted, not based on an exact physical theory but has the great advantage, that it is cheap (in its simplest form about 200 Swedish crowns at the 1974 value of money), makes use of and displays intelligible and influenceable quantities, and in its main variant eliminates most of the injustices in present systems.

The main variant has obviously the "built-in" fault that tenants who intensively air their apartments, at times perhaps even in order thereby to adust their indoor temperatures with radiators switched on, get off rather too cheaply, even if, owing to the long integration period, this would hardly have any decisive significance and can to some extent be compensated by suitable location of the temperature-sensing elements.

To eliminate this disability as well, however, there are at least the following two possibilities.

One can fit switches, preferentially microswitches, both to window and radiator valve. These switches may appropriately be fitted with normally closed contacts connected in parallel, i.e. a circuit is opened when the window is open at the same time as the radiator valve (possibly with the restrictions, in respect of permissible angles of the window). This circuit can then be connected to the integration apparatus in such a way that a presettable "penalty charge" is produced.

Another possibility is — for instance by means of an thermistor — to measure the temperature also in the vicinity of a radiator in the room in question in order thereafter to obtain the difference between this measured value of the temperature and the mean apartment temperature. If this difference exceeds a certain predetermined value, the integrator is operated so as to inaugurate a suitable penalty charge.

Through certain simple measures of, in themselves, known nature it is possible to penalize any abuse through cutting off wires or the like between the various components of the system.

Although the invention has been described with reference to one embodiment of the same, it can nevertheless be arbitrarily varied within the scope of the subsequent claims.

What I claim is:

1. A method for an equitable allocation of heating costs in an apartment building or the like equipped with a central heating plant common to a number of individual consumers (apartments), characterized in that the allocation of said costs is made dependent on the heat comfort really enjoyed by the consumers concerned by being based upon a representative instantaneous value of the air temperature (average temperature) in the apartment in question, said method comprising the steps of determining said temperature value by electric measurement with means highly sensitive to temperature changes and placed at one or more suitable points in the apartment concerned, weighting said temperature value with respect to the room area represented, thereafter integrating the obtained average temperature by passing the measured value via a signal converter to an electric integrating device, the output value of which determines in conjunction with the apartment area the part each individual consumer has in the total heating costs for the apartment building, said integration covering the whole heating season and the temperature measuring device being arranged to switch on and off simultaneously with the electrical equipment for the central heating plant.

2. A method according to claim 1, wherein the measured temperature values are converted in a sine-wave cutting device before they pass to the integrating device if said device is a single phase meter.

3. A method according to claim 1, wherein the step of integrating is performed by means of a step-driven counter after the measured temperature value has been converted in a temperature frequency converter (f) comprising a subsequent frequency division.

4. A method according to claim 1 further comprising the step of comparing the measured average temperature values with a base temperature and so that tenants with temperatures below the base temperature are allowed a discount on a calculated cost for heat consumption at the base temperature, and tenants with a temperature above the base temperature are charged with a penalty added to said calculated cost.

5. A method according to claim 1, wherein the integration device output value is diminished with a value being a function of the time elapsed during the heating season and a value representative of the base temperature.

6. A device for an equitable allocation of heating costs in an apartment building or the like equipped with a central heating plant common to a number of individual consumers (apartments), characterized in that the allocation of said costs is made dependent on the heat comfort really enjoyed by the consumers concerned by being based upon a representative instantaneous value of the air temperature (average temperature) in the apartment in question, comprising:

a certain number of temperature sensors placed in the individual apartments to establish a representative instantaneous air temperature (the average apartment temperature measured at one or several representative points), weighting means connected to each of said temperature sensors, said weighting means comprising electrical resistors having values chosen to regulate the effect each individual temperature sensor with respect to the area it represents in producing a signal representing the total value measured for each apartment, a signal converter for each individual apartment connected to receive the signals representing the measured values, an electric integrating device for each individual apartment connected to integrate the output of said signal converter, and coupling means for automatically switching on said device simultaneously with the electrical equipment of the central heating plant.

7. A device according to claim 6, wherein said signal converter between the weighting means and the integrating device generates signal representative of the measured temperature value to the integrating device.

8. A device according to claim 7, wherein said integrating device is a single phase meter and said signal converter is a sine-wave cutting device, said signal representative of the measured value is connected to one of the single phase meter coils, the AC-voltage from the power mains being connected to the other coil.

9. A device according to claim 7, wherein said integrating device is a step-driven counter and said signal converter is a temperature-frequency converter.

10. A device according to claim 7, wherein said integrating device is an electrolytical current integrator, the results at the end of the integration period being obtained by measurements with reversed current direction.

11. A device according to claim 6, where said thermistors are provided with linearization means.

12. A device according to claim 11, further comprising a comparator means in the form of an electric bridge connected to said linearization means so that the output value of the bridge becomes a function of the difference between the average temperature in question and a base temperature provided in the form of electrical data for the other components incorporated in the bridge.

13. A device according to claim 12, said integrating device is an overload meter wherein the measured temperature value is compared with the value for said base temperature, the presentation device of said meter receiving the difference formed by its differential between the integrated temperature value and another value given in the form of the speed of a synchronous motor-driven counterrotating shaft.

14. A device according to claim 6, wherein the signal representing temperature value prior to being passed to said signal converter passes through an operational amplifier.

15. A device according to claim 6, further comprising a continuously operating division device connected to said integrating device to divide the integrated measured temperature value by the time elapsed at every instant from the beginning of the heating season, thereby allowing the device to be directly graded in degrees Celsius average temperature.

16. A device according to claim 6, further comprising a correcting equipment provided for rooms with high airing frequency, including an additional temperature sensor in the immediate proximity of a radiator, said additional temperature sensor being anti-coupled to the room temperature sensor to form a differential value which on exceeding a certain predetermined value actuates the integrator to debit an adequate penalty charge.

17. A device according to claim 16 wherein both said room temperature sensor and said additional temperature sensor are thermistors.

18. A device according to claim 6 wherein said temperature sensors are thermistors.

* * * * *